United States Patent [19]

Lehureau et al.

[11] Patent Number: 5,272,551
[45] Date of Patent: Dec. 21, 1993

[54] OPTICAL SYSTEM FOR THE REPRODUCTION OF COLOR VIDEO IMAGES

[75] Inventors: Jean-Claude Lehureau, Ste Genevieve des Bois; Jean-Pierre Huignard, Paris, both of France

[73] Assignee: Thomson-CSF, Puteaux, France

[21] Appl. No.: 974,331

[22] Filed: Nov. 10, 1992

Related U.S. Application Data

[63] Continuation of Ser. No. 700,192, filed as PCT/FR90/00685, Sep. 25, 1990, abandoned.

[30] Foreign Application Priority Data

Oct. 3, 1989 [FR] France .................. 89 12888

[51] Int. Cl.⁵ .................. G02B 5/32; G02B 27/44; G02F 1/1335
[52] U.S. Cl. .................. 359/19; 359/24; 359/49
[58] Field of Search .................. 359/15, 19, 20, 22, 359/24, 49

[56] References Cited

U.S. PATENT DOCUMENTS

| | | |
|---|---|---|
| 3,622,219 | 11/1971 | Groh . |
| 3,695,744 | 10/1972 | Clay .................. 359/24 |
| 3,716,658 | 2/1973 | Rackman . |
| 4,082,415 | 4/1978 | Brooks et al. . |
| 4,235,505 | 11/1980 | Hariharan et al. .................. 359/24 |
| 4,447,111 | 5/1984 | Leib . |
| 4,722,037 | 1/1988 | Davis . |
| 4,807,978 | 2/1989 | Grinberg et al. .................. 359/20 |
| 5,011,244 | 4/1991 | Smith et al. .................. 359/24 |

FOREIGN PATENT DOCUMENTS

| | | |
|---|---|---|
| 0336889 | 10/1989 | European Pat. Off. .................. 359/24 |
| 887520 | 8/1953 | Fed. Rep. of Germany . |
| 1772583 | 5/1971 | Fed. Rep. of Germany . |
| 63-305381 | 12/1988 | Japan .................. 359/24 |
| 1-222287 | 9/1989 | Japan .................. 359/24 |
| 1-238680 | 9/1989 | Japan .................. 359/24 |

*Primary Examiner*—Martin Lerner
*Attorney, Agent, or Firm*—Oblon, Spivak, McClelland, Maier & Neustadt

[57] ABSTRACT

The present invention concerns an optical system for the reproduction of color video images, comprising a source of illumination (1), an electro-optical modulator (3) formed from pixels associated with the colors red, green, and blue respectively, and optical collimation means (2) used to illuminate the entirety of the modulator. This system further comprises a series of wavelength-selective holographic lenses (6) making it possible to focus the light of each red, green, or blue component on the associated pixels of the modulator. Applications to videoprojectors and direct viewing.

15 Claims, 2 Drawing Sheets

FIG_1
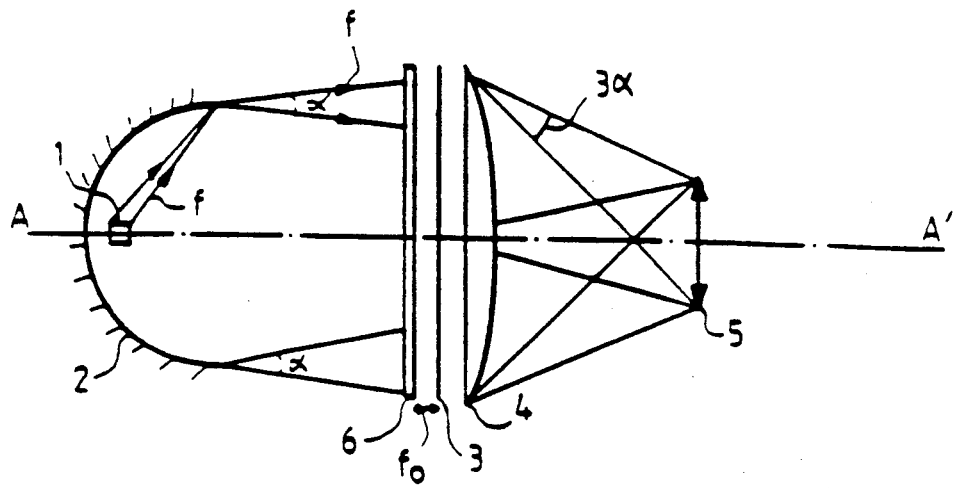
FIG_2
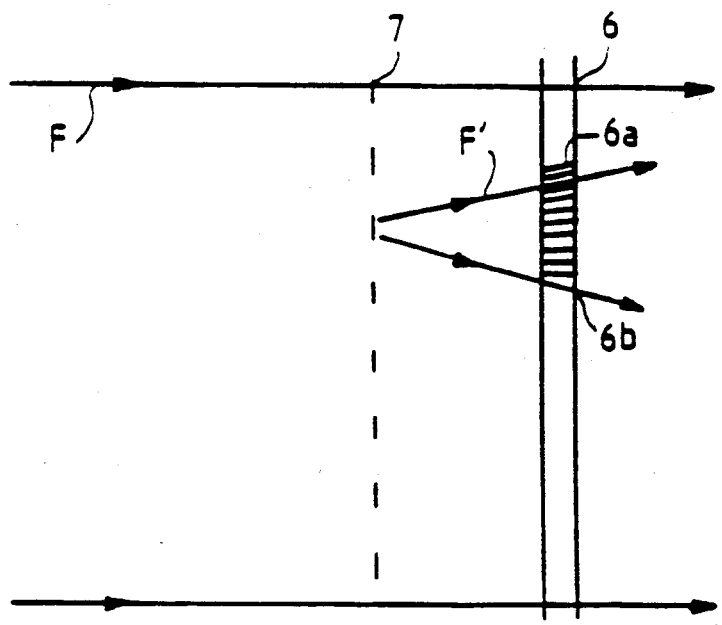

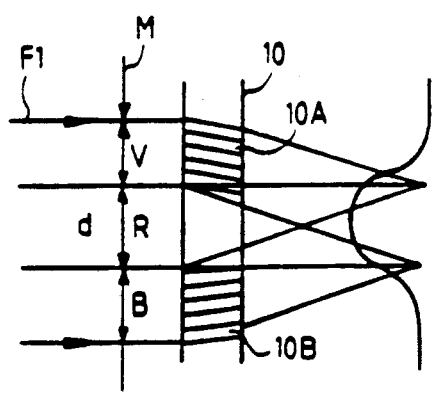
FIG_3
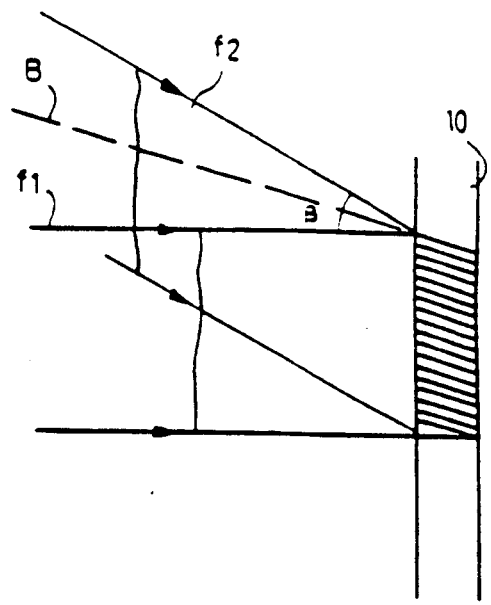
FIG_4
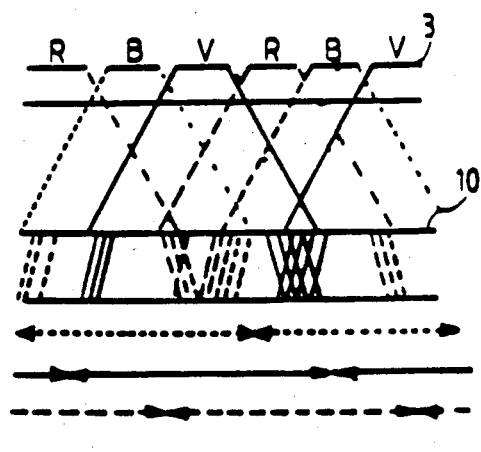
FIG_5
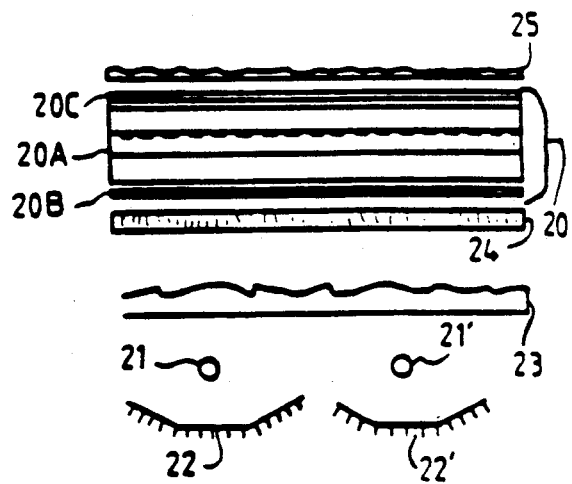
FIG_6

OPTICAL SYSTEM FOR THE REPRODUCTION OF COLOR VIDEO IMAGES

This application is a continuation of application Ser. No. 07/700,192, filed as PCT/FR90/00685, Sep. 25, 1990, now abandoned.

BACKGROUND OF THE INVENTION

1. Field of the Invention

The present invention concerns an optical system for the color reproduction of video images. More specifically, it concerns an optical system of the kind comprising a light source, a color electro-optical modulator composed of pixels linked to the colors red, green, and blue respectively, and optical collimation means used to illuminate the modulator.

2. Discussion of the Background

Optical systems of this kind gay be used either inside a device for the large-screen projection of color video images, termed a videoprojector, or for direct viewing. In the first instance, the optical system is linked conventionally to a condensing lens, a lens, and a screen. In the second case, it preferably comprises a diffuser positioned downstream from the electro-optical modulator.

The main disadvantage of the optical systems of this type currently used, in particular videoprojectors, is the weak luminosity of the image obtained. In fact, in the case of a videoprojector, the luminous flow reaching the screen is at most 150 lumens for a source generating 1,200 lumens. This low luminance is mainly the result of the polarization of the luminous wave lighting the modulator, and also of the color filtering, which reduces luminance by approximately one-third.

To overcome this difficulty, it has been suggested that, particularly in videoprojectors, the primary components of the luminous source be dispersed using dichroic mirrors. However, this technique requires the use of four dichroic mirrors and of three electro-optical modulators, each of which modulates one of the primary components. This arrangements leads to mechanical adjustment problems. Moreover, the apparatus thus created has a relatively large focal length.

SUMMARY OF THE INVENTION

The purpose of the present invention in to solve these problems by proposing an optical system providing higher luminance, by linking to each pixel a light collector specific to the color of this pixel, which increases by a factor of 3 the flow passing through this pixel.

Another purpose of the invention is to propose a new optical system for the reproduction of color video images that can be used both in devices for large-screen projection of video images and for direct viewing.

Accordingly, the purpose of the present Invention is an optical system for the reproduction of color video images comprising a source of illumination, an electro-optical modulator composed of pixels associated with the colors red, green, and blue respectively, and optical collimation means used to illuminate the entire modulator, wherein this system comprises, furthermore, a series of wavelength-selective holographic lenses which make it possible to focus the light of each red, green, or blue component on the corresponding pixels in the modulator.

According to a preferred embodiment, the series of holographic lenses is formed by three superposed holograms formed within a thick layer of a photosensitive materials sensitized to the primary components: red, green, and blue.

In this case, each hologram is recorded by applying the Gabor hologram-recording technique, then a contact duplication.

According to another embodiment, the series of holographic lenses is formed from three superposed holographic lenses produced in a thick layer of a material sensitive to a single color. In this case, each lens is preferably produced in at least two holographic gratings. Each holographic grating is recorded by means of the interference of two luminous beams, for which the bisectrix is the orientation of the strata to be recorded, and for which the angle of intersection is chosen so as to record the desired spacing.

According to one feature of the present invention, the modulator is composed of a liquid crystal screen. However, other electro-optical modulators could be contemplated, especially ferroelectric cells producing an optical effect.

According to an additional feature, the optical system further comprises a diffuser positioned downstream from the electro-optical modulator. In this case, the system is used for direct viewing.

According to yet another application, the optical system may be linked to a condensing lens, a lens and a screen. In this case, the optical system is used in an image-projection device.

According to one feature of this device, the focal length fo of the holographic lenses is equal to: $fo = d/\alpha$, where d represents the size of a pixel and $\alpha$, the angle of divergence of the collimated bean. This importance of this non-arbitrary focal length is that all loss of light is avoided. In fact, a longer focal length causes a loss of light which is focused on a spot larger than the dimension d of the pixel of the corresponding color on the liquid crystal screen, while a shorter focal length leads to a divergence of the emergent bean which is too great to be collected by the projection lens. If the various colored pixels are aligned in one direction, this choice of fo increases by a factor-of 3 the angle of divergence of the beam emerging from the cell.

BRIEF DESCRIPTION OF THE DRAWINGS

Other features and advantages of the present invention will emerge from a reading of the following description of various embodiments, provided with reference to the attached drawings, in which:

FIG. 1 is a diagrammatic view of an image-projection device comprising an optical system conforming to the present invention;

FIG. 2 is a diagram of a first embodiment of a hologram in accordance with the present invention;

FIG. 3, 4, and 5 are diagrams of a second embodiment of holographic lenses according to the present invention; and FIG. 6 is a cross-section of a schematic view of an optical system according to the present invention used for direct viewing.

DESCRIPTION OF THE PREFERRED EMBODIMENTS

As shown in FIG. 1, the device for the color projection of video images according to the present invention is composed mainly of a light source I which, linked to a reflector 2, emits an illuminating beam f which is weakly collimated so as to illuminate evenly the entire surface of an electro-optical modulator 3. In the embodiment illustrated, this modulator 3 is formed by a liquid crystal screen having red, green, and blue triplet lenses. This screen is well known to the specialist. As shown in FIG. 1, this screen 3 is linked to a condensing lens 4 which, in the embodiment illustrated, is positioned beyond the liquid crystal screen 3 in relation to the source 1. In a conventional manner, the above-mentioned components are linked with a lens 5 which projects onto a screen (not shown) the image recorded on the liquid crystal screen 3. In accordance with the present invention, a series of holographic lenses 6 is placed between the source 1 and the electro-optical modulator 3. These lenses focus the light on the corresponding color pixels of the electro-optical modulator. All of the above-mentioned components are centered along the axis AA'.

As shown in FIG. 1, the collimated beam emanating from the source 1 has an angle of divergence $\alpha$. If the electro-optical modulator 3 is formed by a liquid crystal screen having pixels of size d, then the series of holographic lenses 6 must be positioned at a focal length fo from the electro-optical modulator 3, which is chosen so that: $fo = d/\alpha$, where fo represents the focal length of the series of holographic lenses. In fact, a longer focal length of causes a loss of light which is focused on a spot larger than the dimension d of the pixel of the corresponding color on the liquid crystal screen. A shorter focal length leads to a divergence of the emergent beam which is too great to be collected by the projection lens. As shown in FIG. 1, when the pixels of various colors are aligned, this value of fo increases by a factor of 3 the angle of divergence of the beam emerging from the cell, which thus has a value of 3.

Different embodiments of the holographic lenses will now be described with reference to FIGS. 2 to 5. The holographic lenses must be wavelength-selective, in order to allow the focusing of the light of each red, green, or blue component on the corresponding pixels of the modulator. The holographic lenses are thus produced using a material reacting to the, illumination by a change of value, such as dichromated gelatin, in which illumination modifies the water uptake of the gelatin, of copolymers of methacrylic esters binding with aromatic ketones under the effect of radiation.

In this medium, the change of values may reach several percentage points. Consequently, several tens of microns are sufficient to obtain 100% effectiveness. In larger thicknesses, several holograms may thus be superposed.

According to a first embodiments, shown mainly in FIG. 2, the series of holographic lenses is therefore formed by three superposed holograms produced in a thick layer of a material such as that mentioned above, which has been sensitized to the primary components: red, green, or blue.

In this case, each hologram is recorded by using the Gabor hologram-recording technique. As shown in FIG. 2, a parallel bean f of monochromatic light illuminates a shield 7 identical to that of the colored filters of the liquid crystal screen 3. An interference of the light waves of the beam f with the diffracted light waves of the beam f'makes it possible to obtain, in the layer 6 of photosensitive material, the lines represented by 6a and 6b in FIG. 2.

It is generally difficult to effectively sensitize the holographic material to the primary red, green, and blue components. In fact, red in particular is actinic to a slight degree, and the material used is generally sensitive only to blue, or even ultra-violet. Furthermore, sensitization to the strongest wavelengths is achieved by incorporating a coloring agent, which must be destroyed after recording, thereby possibly introducing complex chemical processes. In this case, the holographic lenses are preferably created by using the procedure illustrated in FIGS. 3 to 5. It then becomes preferable to decompose each lens corresponding to a single color into at least two gratings. As shown in FIG. 3, this decomposition is justified by the very low level of resolution required of each lens, which must focus light on a pixel having a dimension d. In this case, a good compromise between the resolution of the lens and the number of shields used is achieved. As illustrated in FIG. 4, each of these gratings may be recorded by means of the interference f1 and f2, whose bisectrix B corresponds to the orientation of the strata to be recorded, and whose angle of intersection $\beta$ between the beams f1 and f2 is chosen so as to record the desired spacing p. In fact, in a hologram, the following equation obtains:

$$1B = = cste\ P\lambda$$

where p represents the spacing of the strata, $\beta$ the angle of interference between the two beams f1 and f2, and $\lambda$ the wavelength of the luminous beam used.

To produce the desired hologram, an appropriate shield is used. Thus, to record red, use is made of the shield M, which occults the red portion corresponding to red pixels on the liquid crystal screen. Thus, the desired grating of holographic lenses is produced through at least six superpositions of gratings, as shown in FIG. 5. In this FIGURE, reference #3 designates a liquid crystal screen formed by red (R), blue (B), and green (V) triplet lenses. The light is filtered, in this case, through a hologram 10, in which components shown in dotted lines represent the strata of the blue filters, the elements shown in solid lines represent the strata of the green filters, and the elements shown in dot-and-dash lines represent the strata of the red filters. In this way, a structure resembling more or less the type illustrated at reference 10 is produced, with differing strata spacings as a function of color.

Another mode of use of an optical system according to the invention will now be described with reference to FIG. 6. Indeed, the optical system according to the present invention may be used in a direct-viewing device. In this case, the device comprises light sources 21, 21' linked to reflectors 22, 22', a collimation element 23 milking it possible to obtain a parallel, slightly collimated beam in accordance with the present invention, a grating of holographic lenses 24 formed in the manner described above, and a liquid crystal screen 20 formed conventionally by a polarizer 20b, the actual screen itself 20a, and an analyzer 20c. If needed, a diffuser 25 may be linked to this device. This diffuser may be of the random type (ground glass) or it may exist as a grating of cylindrical lenses having very small spacing or as two such crossed gratings exhibiting a diagram of horizontal and vertical diffusions which is adapted to the particular need.

In this device, the grating of holographic lenses is produced in the manner described above. The collimated beam is thus focused on the corresponding colored pixels through three rows of superposed holographic lenses. In this case, the distance between the hologram and the electro-optical modulator formed by a liquid crystal screen is not an important feature.

We claim:

1. An optical system for reproduction of color video images comprising:
 a light source;
 an electro-optical modulator formed by pixels of red, green and blue components, respectively;
 optical collimation means to illuminate the entire electro-optical modulator; and
 a series of wavelength-selective holographic lenses placed between the light source and the electro-optical modulator to focus light of each red, green and blue component of the collimated beam output from the optical collimation means onto the corresponding pixels of the electro-optical modulator, wherein the series of holographic lenses is formed of three superposed holographic lenses corresponding to the respective red, green and blue components, and wherein each of these three superposed holographic lenses corresponding to the respective red, green and blue components is formed in a same recording medium layer and wherein a focal length fo of the holographic lenses is equal to: $fo = d/\alpha$, where d represents a size of the pixels and $\alpha$ represents an angle of divergence of the collimated beam.

2. The optical system according to claim 1, wherein the series of holographic lenses formed by three superposed holograms is produced within a thick layer of a photosensitive material sensitized to the red, green, and blue components.

3. The optical system according to claim 2, wherein each holographic lens is recorded by using a Gabor hologram-recording technique.

4. The optical system according to claim 1, wherein each holographic grating is recorded by means of interference of two luminous beams whose bisectrix is an orientation of strata to be recorded and whose angle of intersection is chosen so as to record a desired spacing.

5. The optical system according to any of claims 1 to 4, wherein the photosensitive material is chosen from among dichromated gelatin or copolymers of methacrylic esters binding with aromatic ketones under the effect of radiation.

6. The optical system according to any of claims 1 to 4, wherein the electro-optical modulator is formed by a liquid crystal screen.

7. The optical system according to any of claims 1 to 4, further comprising a diffuser positioned downstream from the electro-optical modulator.

8. The optical system according to claim 1, wherein a focal length fo of the holographic lenses is equal to: $fo = d/\alpha$, where d represents a size of the pixels and $\alpha$ represents an angle of divergence of the collimated beams.

9. The optical system according to claim 1, wherein the series of holographic lenses is formed by three superposed holograms produced within a thick layer of a photosensitive material sensitized to the red, green, and blue components.

10. An optical system for reproduction of color video images comprising:
 a light source;
 an electro-optical modulator formed by pixels of red, green and blue components, respectively;
 optical collimation means to illuminate the entire electro-optical modulator; and
 a series of wavelength-selective holographic lenses placed between the light source and the electro-optical modulator to focus light of each red, green and blue component of light output from the optical collimation means onto the corresponding pixels of the electro-optical modulator, wherein a focal length fo of the holographic lenses is equal to: $fo = d/\alpha$, where d represents a size of the pixels and $\alpha$ represents an angle of divergence of the collimated beam, and wherein the series of holographic lenses is formed from three superposed holographic lenses corresponding to the respective red, green and blue components, and wherein each of these three superposed holographic lenses corresponding to the respective red, green and blue components is formed in a same recording medium layer comprising a thick layer of a material sensitive to a single color.

11. The optical system according to claim 10, wherein each holographic lens is recorded by using a Gabor hologram-recording technique.

12. The optical system according to claim 10, wherein each holographic grating is recorded by means of interference of two luminous beams whose bisectrix is an orientation of the strata to be recorded and whose angle of intersection is chosen so as to record a desired spacing.

13. The optical system according to any of claims 9 to 11, wherein the photosensitive material is chosen from among dichromated gelatin or copolymers of methacrylic esters binding with aromatic ketones under the effect of radiation.

14. The optical system according to any of claims 9 to 11, wherein the electro-optical modulator is formed by a liquid crystal screen.

15. The optical system according to any of claims 9 to 11, further comprising a diffuser positioned downstream from the electro-optical modulator.

* * * * *